United States Patent
Daniels et al.

(10) Patent No.: US 8,880,692 B2
(45) Date of Patent: Nov. 4, 2014

(54) METHOD OF CASCADING TRANSFER OF AUTHORIZATION RIGHTS FOR FILE ACCESS

(75) Inventors: Fonda J. Daniels, Cary, NC (US); James Patrick Galvin, Jr., Georgetown, KY (US); Ruthie D. Lyle, Durham, NC (US); Michael Muller, Medford, MA (US); Martin Presler-Marshall, Chapel Hill, NC (US); David M. Wendt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 11/554,065

(22) Filed: Oct. 30, 2006

(65) Prior Publication Data

US 2008/0104240 A1 May 1, 2008

(51) Int. Cl.
| | | |
|---|---|---|
| *G06F 15/173* | (2006.01) | |
| *H04L 29/06* | (2006.01) | |
| *G06F 15/16* | (2006.01) | |
| *G06F 21/00* | (2013.01) | |
| *H04N 7/167* | (2011.01) | |
| *H04L 29/08* | (2006.01) | |

(52) U.S. Cl.
CPC ............. *H04L 63/105* (2013.01); *H04L 67/06* (2013.01)
USPC ........... 709/225; 709/223; 709/245; 713/181; 713/184; 380/239

(58) Field of Classification Search
USPC ................................................ 709/223–226
See application file for complete search history.

(56) References Cited

U.S. PATENT DOCUMENTS

| | | | |
|---|---|---|---|
| 4,935,869 A * | 6/1990 | Yamamoto ..................... 707/202 |
| 5,995,982 A | 11/1999 | Mercer | |
| 6,275,825 B1 * | 8/2001 | Kobayashi et al. ................... 1/1 |
| 6,349,404 B1 | 2/2002 | Moore et al. | |
| 6,658,464 B2 | 12/2003 | Reisman | |
| 6,742,023 B1 | 5/2004 | Fanning et al. | |
| 2002/0087947 A1 | 7/2002 | Kwon et al. | |
| 2003/0014477 A1 | 1/2003 | Oppenheimer et al. | |
| 2003/0177194 A1 | 9/2003 | Crocker et al. | |
| 2003/0182470 A1 | 9/2003 | Carlson et al. | |
| 2003/0188019 A1 * | 10/2003 | Wesley ......................... 709/245 |
| 2003/0217275 A1 * | 11/2003 | Bentley et al. ................. 713/184 |

(Continued)

FOREIGN PATENT DOCUMENTS

JP 60233746 A * 11/1985

OTHER PUBLICATIONS

Michael Kaminsky et al;Decentralized User Authentication in a Global File System;Oct. 19-22, 2003,;SOSP'03;ACM;60-73.*

*Primary Examiner* — Evans Desrosiers
(74) *Attorney, Agent, or Firm* — Ryan Lewis; Hoffman Warnick LLC

(57) ABSTRACT

The present invention provides a method, system, and computer program product for transferring authorization rights to access a file. A method in accordance with an embodiment of the present invention includes: designating a location to store the file; creating a file-transfer-reference for the file based on the location; creating an authorization protocol for the file; selecting at least one recipient of the file-transfer-reference; and forwarding the file-transfer-reference to the at least one recipient according to the authorization protocol. The method may optionally include defining a validity period for which for access to the file.

9 Claims, 3 Drawing Sheets

(56) References Cited

U.S. PATENT DOCUMENTS

| | | |
|---|---|---|
| 2004/0103156 A1 | 5/2004 | Quillen et al. |
| 2004/0162877 A1 | 8/2004 | Van Dok et al. |
| 2004/0168055 A1 | 8/2004 | Lord et al. |
| 2004/0177335 A1 | 9/2004 | Beisiegel et al. |
| 2004/0199514 A1 | 10/2004 | Rosenblatt et al. |
| 2004/0268295 A1 | 12/2004 | Culter |
| 2005/0004995 A1 | 1/2005 | Stochosky |
| 2005/0138603 A1 | 6/2005 | Cha et al. |
| 2007/0124583 A1* | 5/2007 | Andersson et al. ........... 713/165 |
| 2007/0209064 A1* | 9/2007 | Qin et al. ........................ 726/5 |

* cited by examiner

US 8,880,692 B2

METHOD OF CASCADING TRANSFER OF AUTHORIZATION RIGHTS FOR FILE ACCESS

BACKGROUND OF THE INVENTION

1. Field of the Invention

The present invention generally relates to transfer of authorization rights to access a file from a source to one or multiple destinations, and more specifically relates to cascading transfer of authorization rights on a remote basis.

2. Related Art

In an instant messaging (IM) network, file transfer functionality is incorporated such that a user may use an IM client to capture and transfer a file via the IM network to a recipient IM user. On receipt of a file, the client of the recipient IM user displays a graphic indicator to notify the recipient that the sender has initiated a file transfer. Transfer of the file is initiated when the recipient accesses the graphic indicator.

Typically, the file to be transferred is located on the machine of the sender or a server, for example, IBM's Same-Time supports the former approach while Yahoo's Messenger supports the latter. Currently available technology provides for immediate transfer or delayed transfer of the file, up to 48 hours between active parties in the same IM session. Parties outside of the IM session do not have access to the file and there is no forwarding mechanism to facilitate access to the transferred file by non-current IM parties.

Accordingly, a need exists for way to disseminate authority to secondary, tertiary or subsequent parties/recipients of an IM session for access to a transferred file.

SUMMARY OF THE INVENTION

The present invention transfers authorization rights for access to a file between multiple parties through an authorization protocol that allows the file to be retrieved and/or manipulated according an authorization level accorded to a recipient.

A first aspect of the present invention is directed to a method for transferring authorization rights to access a file, comprising: designating a location to store the file; creating a file-transfer-reference for the file based on the location; creating an authorization protocol for the file; selecting at least one recipient of the file-transfer-reference; and forwarding the file-transfer-reference to the at least one recipient according to the authorization protocol.

A second aspect of the present invention is directed to a system for transferring authorization rights to access a file, comprising: a system for designating a location to store the file; a system for creating a file-transfer-reference for the file based on the location; a system for creating an authorization protocol for the file; a system for selecting at least one recipient of the file-transfer-reference; and a system for forwarding the file-transfer-reference to the at least one recipient according to the authorization protocol.

A third aspect of the present invention is directed to a program product stored on a computer readable medium for transferring authorization rights to access a file, the computer readable medium comprising program code for: designating a location to store the file; creating a file-transfer-reference for the file based on the location; creating an authorization protocol for the file; selecting at least one recipient of the file-transfer-reference; and forwarding the file-transfer-reference to the at least one recipient according to the authorization protocol.

A fourth aspect of the present invention is directed to a method for deploying an application for transferring authorization rights to access a file, comprising: providing a computer infrastructure being operable to: designate a location to store the file; create a file-transfer-reference for the file based on the location; create an authorization protocol for the file; select at least one recipient of the file-transfer-reference; and forward the file-transfer-reference to the at least one recipient according to the authorization protocol.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings in which.

Figure 1:
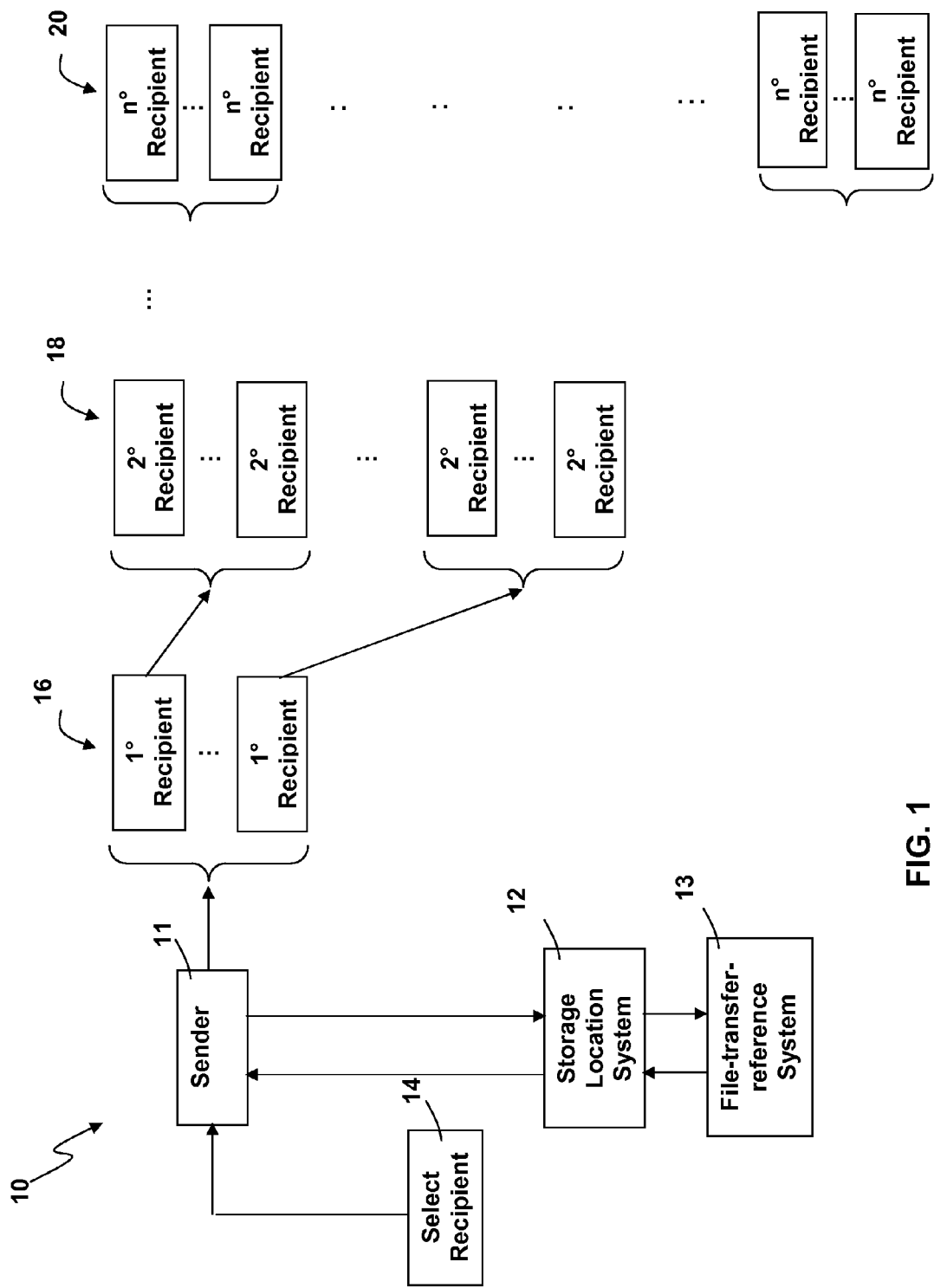
FIG. 1 depicts an illustrative system for transferring authorization rights to access a file in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

A cascading authorization rights transfer system 10 for sharing access to a file in a storage location system 12, in accordance with an embodiment of the present invention is depicted in FIG. 1. Cascading authorization rights transfer system 10 provides to a sender 11, who intends to share a file with multiple recipients, a storage location system 12, a system 13 for creating a file-transfer-reference, a system (not shown) for creating an authorization protocol for establishing various authorization levels, a system 14 for selecting a recipient of the file-transfer-reference and a system (not shown) for forwarding the file-transfer-reference to the selected recipient in accordance with the authorization protocol.

Storage location 12 may be a local directory on a client machine of the sender or a transfer directory on a server, for example, a virtual server farm that is geographically independent of the sender 11 or recipient(s) 16. Storage location 12 facilitates authorized access or retrieval of the file at the convenience of the recipient and with the transfer directory on a server, access does not involve the sender once the file-transfer-reference is forwarded with the authorization protocol. System 13 creates a file-transfer-reference associating the file to storage location 12 and may include additional information fields like a protocol specifier, a file server and a file name.

The authorization protocol establishes a plurality of authorization levels which may be selectively accorded to any recipient 16 in the primary (1°) group, any recipient 18 in the secondary (2°) group, or any other group up to the no group of recipients 20. The plurality of authorization levels are initially set by sender 11. In the primary (1°) group of recipients 16, each recipient of the file-transfer-reference is authorized, amongst the plurality of authorization levels, to access the file within a validity period. The number and/or type of authorization levels may differ from one recipient to another recipient. This applies to recipients of other groups or between recipients from different groups.

Authorization levels may be defined according to the type of authorization a recipient is empowered to exercise. For example, one recipient in 16 may be empowered to: read the file and forward the file-transfer-reference only and would be accorded a lower authorization level when compared to another recipient in 16 who may be empowered, on top of reading the file and forwarding the file reference, to: select another recipient or a plurality of recipients 18, forward the file-transfer-reference to the selected recipient(s) 18, add or remove file access rights along with forwarding the file-transfer-reference, change the validity period of access, etc. At a higher authorization level, a recipient from any of 16, 18 or 20 may be empowered to exercise more rights and may be accorded the authority to change the properties of the file, which may include the right to: modify the file-access-rights, determine the length of validity period, select recipients, forward the file-transfer-reference, determine the authorization level, etc. to which another recipient from any of 16, 18 or 20 receiving the file-transfer-access would be empowered to exercise. To this extent, some or certain combination of these authorization levels may empower a recipient in group 16 and/or another group 18 or 20 to initiate the method steps of creating an authorization protocol for the file; selecting at least one recipient of the file-transfer-reference; and forwarding the file-transfer-reference to another recipient in group 18. For example, recipients from any of 16, 18 or 20 may be segregated according to authorization levels to form a list consisting of: a readers' list, where the recipient, e.g. selected from 16, is authorized to access the file for read-only; and a managers' list, where besides being authorized to read the file, the recipients, e.g. another recipient selected from 16 or 18 or 20, in this list are authorized to add readers, remove readers, add/remove readers, add managers, remove managers and add/remove managers. As such, disseminating authorization to access the file may be protracted to multiple tiers, from a primary, 1°, group 16 to a secondary, 2°, group 18 until an nth, n°, group 20 of recipients, where n is an integer. The number of recipients in each tier may vary from at least one to any number.

In one embodiment, a visual indicator may be included as part of system 10 for alerting a recipient of a pending file-transfer-reference if the recipient was not in direct communication at the time the sender has forwarded the file-transfer-reference. Another embodiment, system 10 incorporates using a password to protect the file as part of the authorization protocol.

Figure 2:
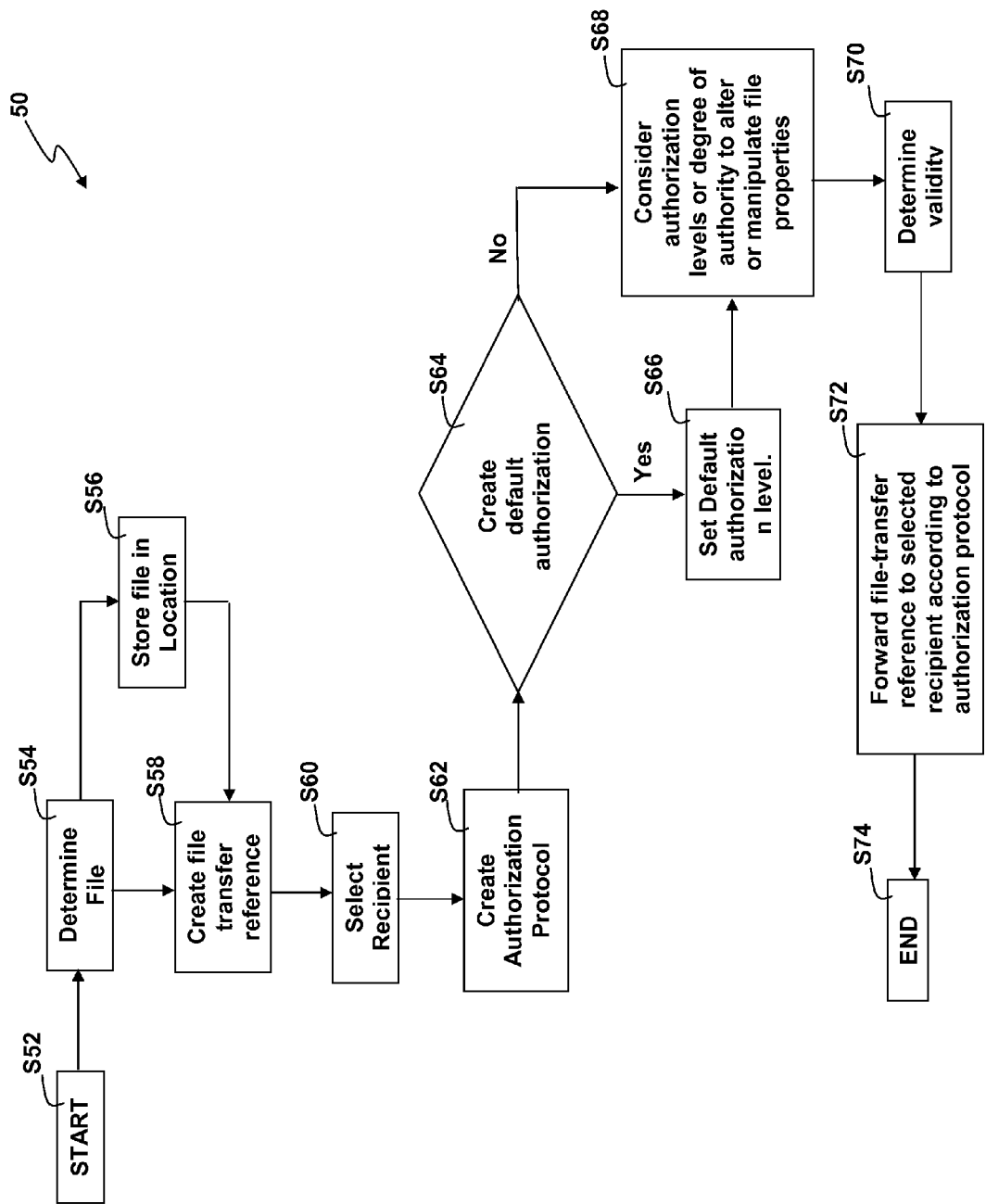
FIG. 2 depicts a flow diagram of an illustrative process for transferring authorization rights to access a file in accordance with an embodiment of the present invention.

A flow diagram 50 of an illustrative process for determining the transferring authorization rights to access of a file in accordance with an embodiment of the present invention is depicted in FIG. 2. The flow diagram 50 is described below in conjunction with the components of the illustrative cascading authorization rights transfer system 10 depicted in FIG. 1.

In step S52, the sender 11 activates the cascading authorization rights transfer system 10 where a file to be shared is determined in step S54. The file is then stored in a location 12 in step S56 and a file-transfer-reference is generated with system 13 based on this location in step S58.

In step S60, the sender 11 selects recipients 16 using system 14. and creates a list. Sender 11 may optionally create multiple lists to which different authorization levels may be designated.

In step S62, sender 11 creates the authorization protocol and a check is made to determine if a default authorization level is to be set in step S64. If the sender 11 selects a default authorization level, for example, authorized to access the file for read-only purpose, step S66 is activated before consideration for additional authorization levels is activated in step S68. If sender 11 selects not to have a default authorization level, step S66 is omitted and step S68 will follow immediately after step S64. Once the authorization level and/or type is selected in step S68, the period within which the selected authorization level(s) remains valid is set in step S70. Following the set validity period in step S70, the file-transfer-reference is forwarded with the set authorization protocol in step S66 and/or S68 to the selected recipients 16 selected in step S60. The illustrative process terminates after step S72 at step S74. Where recipient 16 is empowered to transfer authorization to another recipient 18, steps S60 through S74 may be repeated with recipient 16 assuming the sender's 11 role. The above-example is provided for illustrative purposes only. Many other schemes for transferring authorization rights to access a file originating from a sender 11 are also possible.

Figure 3:
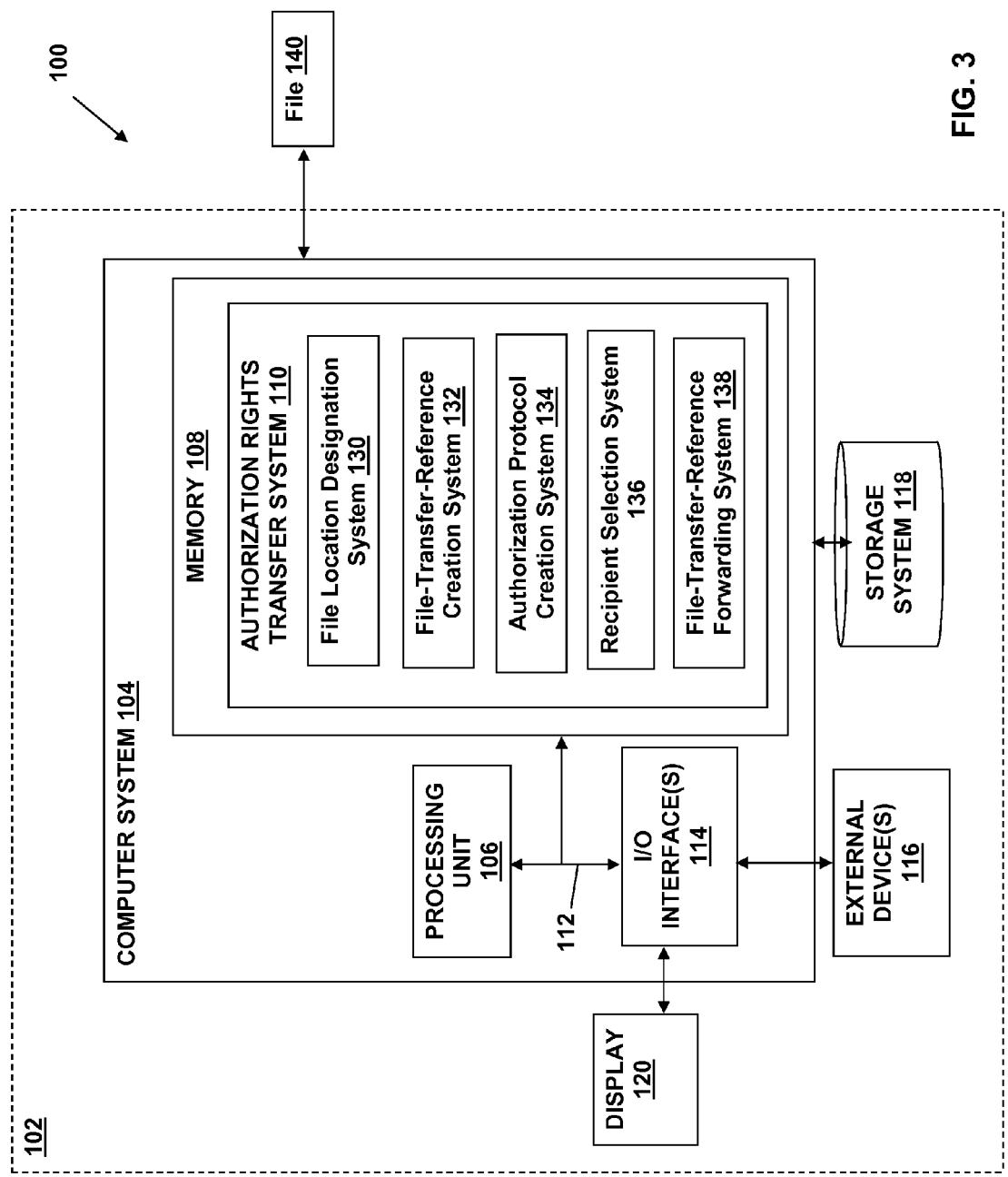
FIG. 3 depicts an illustrative computer system for implementing embodiment(s) of the present invention.

FIG. 3 shows an illustrative system 100 for transferring authorization rights to access of a file in accordance with embodiment(s) of the present invention. To this extent, the system 100 includes a computer infrastructure 102 that can perform the various process steps described herein for sharing a file through cascading transfer of authorization rights. In particular, the computer infrastructure 102 is shown including a computer system 104 that comprises a cascading authorization rights transfer system 110, which enables the computer system 104 to designate authorization rights 130 to access a file 140 by performing the process steps of the invention.

The computer system 104 is shown as including a processing unit 106, a memory 108, at least one input/output (I/O) interface 114, and a bus 112. Further, the computer system 104 is shown in communication with at least one external device 116 and a storage system 118. In general, the processing unit 106 executes computer program code, such as the authorization rights transfer system 110, that is stored in memory 108 and/or storage system 118. While executing computer program code, the processing unit 106 can read and/or write data from/to the memory 108, storage system 118, and/or I/O interface(s) 114. Bus 112 provides a communication link between each of the components in the computer system 104. The at least one external device 116 can comprise any device (e.g., display 120) that enables a user (not shown) to interact with the computer system 104 or any device that enables the computer system 104 to communicate with one or more other computer systems.

In any event, the computer system 104 can comprise any general purpose computing article of manufacture capable of executing computer program code installed by a user (e.g., a personal computer, server, handheld device, etc.). However, it is understood that the computer system 104 and the authorization rights transfer system 110 are only representative of various possible computer systems that may perform the various process steps of the invention. To this extent, in other embodiments, the computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, the computer infrastructure 102 is only illustrative of various types of computer infrastructures that can be used to implement the invention. For example, in one embodiment, the computer infrastructure 102 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the authorization rights transfer system 110 includes a file location designation system 130 for designating a location for the file 140. To this extent, the authorization rights transfer system 110 is shown as including a file transfer reference creation system 132 for allocating a reference (e.g., file name, URL, etc) at which the file is stored to enable retrieval of the file by a recipient, an authorization protocol creation system 134, a recipient selection system 136 and a file transfer reference forwarding system 138. Operation of each of these systems is discussed above. It is understood that some of the various systems shown in FIG. 3 can be implemented independently, combined, and/or stored in memory for one or more separate computer systems 104 that communicate over a network. Further, it is understood that some of the systems and/or functionality may not be implemented, or additional systems and/or functionality may be included as part of the system 100.

While shown and described herein as a method and system for transferring authorization rights to access a file, it is understood that the invention further provides various alternative embodiments. For example, in one embodiment, the invention provides a computer-readable medium that includes computer program code to enable a computer infrastructure to transfer authorization rights to access a file. To this extent, the computer-readable medium includes program code, such as the authorization rights transfer system 110, which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), and/or on one or more data storage portions of a computer system, such as the memory 110 and/or storage system 118 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to manage sharing of a file as described above. In this case, the service provider can create, maintain, support, etc., a computer infrastructure, such as the computer infrastructure 102, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of sharing a file. In this case, a computer infrastructure, such as the computer infrastructure 102, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as the computer system 104, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of the preferred embodiments of this invention has been presented for purposes of illustration and description. It is not intended to be exhaustive or to limit the invention to the precise form disclosed, and obviously, many modifications and variations are possible.

The invention claimed is:

1. A method for transferring authorization rights to access a file, the method comprising:
   designating, using a computer hardware device, a storage location for the file;
   creating, using the computer hardware device, a file-transfer-reference for the file based on the storage location, wherein the file-transfer-reference identifies the storage location;
   creating, using the computer hardware device, an authorization protocol for the file;
   selecting, using the computer hardware device, at least one recipient of the file-transfer-reference;
   defining a validity period for the at least one recipient to access the file; and
   forwarding, using the computer hardware device, the file-transfer-reference to the at least one recipient according to the authorization protocol, wherein the authorization protocol includes a plurality of authorization levels, wherein the at least one recipient is accorded at least one of the plurality of authorization levels, wherein the at least one of the plurality of authorization levels empowers the at least one recipient to initiate the method step for creating a new authorization protocol and selecting a second at least one recipient of the file-transfer-reference; and forwarding the file-transfer-reference to the second at least one recipient according to the new authorization protocol, wherein each of the at least one recipient initiates creating an authorization protocol for the file; selecting at least one recipient of the file-transfer-reference; and forwarding the file-transfer-reference to the recipient according to the authorization protocol, and wherein the file-transfer-reference includes additional information fields selected from a group consisting of: a protocol specifier, a file server and a file name.

2. The method of claim 1, wherein the plurality of the authorization levels authorizes the at least one recipient to retrieve the file from the location.

3. The method of claim 2, wherein the plurality of authorization levels further include authorizing the at least one recipient to change the properties of the file.

4. The method of claim 1, further comprising: alerting the at least one recipient of a pending file-transfer-reference with a visual indicator.

5. The method of claim 1, wherein the file is protected by a password.

6. A system for transferring authorization rights to access a file, the system on a computer hardware device and comprising:
   a system for designating a storage location for the file;
   a system for creating a file-transfer-reference for the file based on the storage location, wherein the file-transfer-reference identifies the storage location;
   a system for creating an authorization protocol for the file;
   a system for selecting at least one recipient of the file-transfer-reference;
   a system for defining a validity period for the at least one recipient to access the file;
   a system for forwarding the file-transfer-reference to the at least one recipient according to the authorization protocol, wherein the authorization protocol includes a plurality of authorization levels, wherein the at least one recipient is accorded at least one of the plurality of authorization levels, wherein the at least one of the plurality of authorization levels empowers the at least one recipient to initiate the system for creating a new authorization protocol and selecting a second at least one recipient of the file-transfer-reference; and forwarding the file-transfer-reference to the second at least one recipient according to the new authorization protocol, and wherein the at least one recipient is accorded at least one of the plurality of authorization levels to retrieve the file from the location; and
   a system for defining a validity period for the at least one recipient to access the file, wherein each of the at least one recipient initiates a further system comprising: a system for creating an authorization protocol for the file; a system for selecting at least one recipient of the file-transfer-reference; and a system for forwarding the file-transfer-reference to the recipient according to the authorization protocol, and wherein the file-transfer-reference includes additional information fields selected from a group consisting of: a protocol specifier, a file server and a file name.

7. The system of claim 6, wherein the plurality of authorization levels authorizes the at least one recipient to change a property of the file.

8. A program product stored on a non-transitory computer readable medium for transferring authorization rights to access a file, the computer readable medium comprising executable program code for:
   designating a storage location for the file;
   creating a file-transfer-reference for the file based on the storage location, wherein the file-transfer-reference identifies the storage location;
   creating an authorization protocol for the file;
   selecting at least one recipient of the file-transfer-reference;
   defining a validity period for the at least one recipient to access the file; and
   forwarding the file-transfer-reference to the at least one recipient according to the authorization protocol, wherein the authorization protocol includes a plurality of authorization levels, wherein the at least one recipient is accorded at least one of the plurality of authorization levels, wherein the at least one of the plurality of authorization levels empowers the at least one recipient to initiate the method step for creating a new authorization protocol and selecting a second at least one recipient of the file-transfer-reference; and forwarding the file-transfer-reference to the second at least one recipient according to the new authorization protocol, wherein each of the at least one recipient initiates creating an authorization protocol for the file; selecting at least one recipient of the file-transfer-reference; and forwarding the file-transfer-reference to the recipient according to the authorization protocol, and wherein the file-transfer-reference includes additional information fields selected from a group consisting of: a protocol specifier, a file server and a file name.

9. A method for deploying an application for transferring authorization rights to access a file, comprising:
   providing a computer hardware device infrastructure being operable to:
   designate a storage location for the file;
   create a file-transfer-reference for the file based on the storage location, wherein the file-transfer-reference identifies the storage location;
   create an authorization protocol for the file;
   select at least one recipient of the file-transfer-reference;
   define a validity period for the at least one recipient to access the file; and
   forward the file-transfer-reference to the at least one recipient according to the authorization protocol, wherein the authorization protocol includes a plurality of authorization levels, wherein the at least one recipient is accorded at least one of the plurality of authorization levels, wherein the at least one of the plurality of authorization levels empowers the at least one recipient to initiate the method step for creating a new authorization protocol and selecting a second at least one recipient of the file-transfer-reference; and forwarding the file-transfer-reference to the second at least one recipient according to the new authorization protocol, wherein each of the at least one recipient initiates creating an authorization protocol for the file; selecting at least one recipient of the file-transfer-reference; and forwarding the file-transfer-reference to the recipient according to the authorization protocol, and wherein the file-transfer-reference includes additional information fields selected from a group consisting of: a protocol specifier, a file server and a file name.

* * * * *